United States Patent Office 3,128,588
Patented Apr. 14, 1964

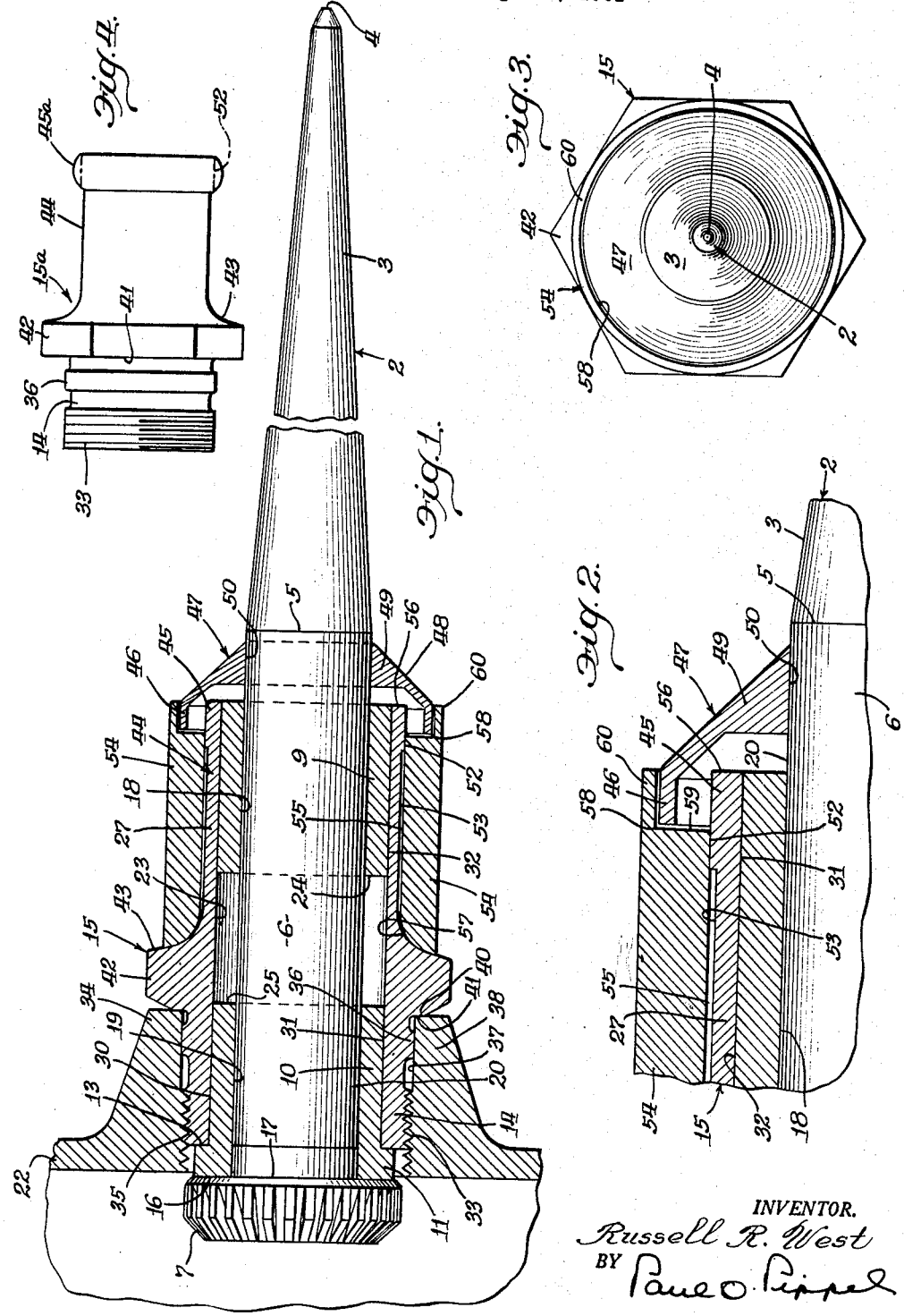

3,128,588
COTTON PICKING SPINDLE NUT STRUCTURE
Russell R. West, Pine Bluff, Ark., assignor to International Harvester Company, Chicago, Ill., a corporation of New Jersey
Filed Aug. 28, 1961, Ser. No. 134,527
5 Claims. (Cl. 56—50)

This invention relates to a novel means and method for converting a cotton picker spindle nut of current design to an improved design.

For many years cotton pickers have been sold with a spindle nut of a type having a shield which telescopes over an enlarged free end of the tubular part of the nut. This construction has been found to wrap cotton and the increase in the number of bales per acre has posed a serious problem insofar as wrapping is concerned so that large wrappings of the cotton around the nuts have been dropping off into the volume of cotton passing through the drum thereby aggravating the problem of contamination. Recently there has been developed a spindle nut which sheds the cotton and prevents the build-up. This is shown in U.S. Patent 2,934,878.

It is an object of the present invention to recondition the old nut structures as shown in U.S. Patent 2,497,777 in such a manner that they simulate the new construction and yet provide an improved structure.

The invention contemplates removing the bead about the outer periphery of the tubular or holder portion of the nut and sleeving a cylindrical sleeve over such milled-off portion, the sleeve having a novel contoured inner end portion which complementally wedges onto a tapered wedge surface of the old nut structure so as to maintain the sleeve in concentricity with the nut.

The invention contemplates the utilization of the shell of the tubular holder portion so that it serves as an adequate backing for a sintered bronze bushing mounted therewithin and which in turn journals the cotton picker spindle, the shell also mounting a cylindrical sleeve which has an axially directed flange spaced radially with respect to the adjacent end of the shell and defining an annular outwardly open groove therewith into which is admitted an inwardly directed axial flange portion of a shield mounted upon the picker spindle.

These and other objects of the invention will become more apparent from the specification and the drawings, wherein:

FIG. 1 is a longitudinal axial section of the reconditioned nut structure;

FIG. 2 is a fragmentary enlarged sectional view thereof;

FIG. 3 is an end view of the structure; and

FIG. 4 illustrates the old nut in side elevation.

Describing the invention in detail, the cotton picker spindle generally designated 2 may be of conventional form and including a tapered picker portion 3, which terminates to a pointed outer end 4 and a base end 5. The base end 5 of the picker portion merges into a cylindrical journal portion 6 which at the inner end of the spindle is preferably formed integral with the driving gear 7, as will be readily understood by those skilled in the art. The shank portion 6 is journaled within forward and rear or inner and outer bearing portions 10 and 9 of cylindrical form, the inner bearing 10 having an outturned radial inner end flange 11 which has an outer side 13 seating against the inner end portion 14 of the nut structure generally designated 15. The flange 11 has an inner radial side 16 which is adapted for engagement by the outer side 17 of the side bevel gear 7.

It will be understood that there is a running clearance between the internal cylindrical bore surfaces 18 and 19 of bearings 9 and 10 and the outer periphery 20 of the journal portion 6 of the spindle and between the radial surfaces 16 and 17 to admit oil from the interior of the support bar 22 of the drum structure from which the spindle is carried as more fully explained in U.S. Patent 2,743,569. The oil in such flush-type lubrication system migrates into the chamber 23 which is defined between the adjacent ends 24 and 25 of the outer and inner bearings 9 and 10 which are spaced axially with respect to the journal portion 6. The bearings 9 and 10 are press fitted into the outer and inner end portions 27 and 14 of the nut structure 15 and more specifically, the inner bearing has an outer cylindrical periphery 30 which fits into the bore 31 and the outer bearing 9 has its outer periphery 32 which fits with a press-fit into the bore 31.

As best seen in FIGS. 1 to 3, which show the improved nut structure designated 15, and the old nut structure shown in FIG. 4 designated 15a, both of these structures have their inner end portion 14 externally threaded as at 33 which threads into the holder boss 34 as at 35. Each nut 15 and 15a further has a cylindrical guide collar 36 which fits into a complementary bore 37 at the outer end portion 38 of the support boss 34 of the associated spindle support column.

The outer extremity of the portion 38 is provided with a radial abutment surface 40 which engages against a backside radial abutment surface 41 on a wrench engaging hexagonal portion 42 formed on the nut member 15 intermediate its ends. The engagement between 40 and 41 serves to limit threading of the nut member 15 into the holder 34.

It will be noted that each nut structure 15 and 15a has the outer side 43 of its wrench engaging portion 42 formed as a conical outwardly tapering surface which in the nut 15a merges into a substantially cylindrical tubular portion 44 which at its outer extremity is provided with an annular radially extending shoulder 45a. The shoulder 45a was initially intended as a guard against the entry of dirt between it and the radially overlapping axially directed, rearwardly projecting, annular flange 46 of the shield generally designated 47, said shield 47 having a conical outwardly tapered cotton shedding surface 48 provided on the body portion 49 which has a central bore 50 admitting in press-fit relation the shank portion 6 of the spindle.

It has been found that this combination of a shield which rotates about a stationary holder attributed to the wrapping of cotton around the holder portion 44 with the heretofore explained results.

The problems presented by this nut structure led to a solution provided in U.S. Patents 2,856,744 and 2,934,878. Inasmuch as the new nut structure and assembly prove superior to that shown in FIG. 4, which was the old nut structure, and prevented the accumulation of cotton, wholesale replacements have been made to the new nut structure. This, of course, necessitated discarding the old nut structure with consequent expense to the owner.

I have devised a novel method and means for salvaging the old nut structure and additionally for salvaging the old shield. This is accomplished by means of the following technique. The old nut structure is milled or suitably cut down about its shoulder 45a to provide the shoulder 45 with a substantially cylindrical surface 52 raised slightly from the periphery 53 of the tubular portion 44. A smooth surface cylindrical sleeve 54 is provided which has an internal bore 55 of slightly less diameter than that of the cylindrical shoulder 45 and the sleeve 44 is pressed on endwise over the free end 56 of the portion 44 until the conical surface 57 on the inner end of the sleeve engages the surface 43. The sleeve is provided with an outer end axial annular groove 58 which is defined by a radial outer edge 59 on the sleeve and a peripheral annular flange 60 which overlaps the outer end portion 56 of the inner nut shell 44. The groove 58 admits the axial annular flange 46 of the shield therein and forms a labyrinth seal therewith and the end portion 56 provides a rigid backing for the outer end of the outer sintered powdered metal bearing 9.

What is claimed is:

1. A cotton picker spindle nut structure comprising a tubular member defining an axially disposed internal bore and having inner, outer and intermediate portions, said inner end portion having an outer peripheral threaded section, a wrench-engaging part on the intermediate portion having a radial abutment surface facing said threaded section and having a generally conical surface facing said outer end portion, and a sleeve having a bore admitting said outer end portion, said sleeve having an inner end with a generally conical surface complementally seating against said generally conical surface on the wrench-engaging part, said sleeve having an axial flange radially spaced from and overlapping the outer end of said outer end portion and developing an axially directed groove therewith.

2. A cotton picker nut comprising a generally cylindrical element with an internal bearing-mounting bore therein, said element having inner, outer and intermediate portions, said inner portion being externally threaded for mounting in an associated support, said intermediate portion having an enlarged part presenting a support-engaging face on one side and a generally conical face on the other side, said outer end portion having a free end with an annular shoulder thereabout, a sleeve telescoped over the outer portion and having an outer smooth contour and having a bore snugly admitting said shoulder therein, said bore terminating in an inner end flared surface seating against said conical face, said sleeve having an outer end with a peripheral annular flange and an inwardly stepped radial surface defining an outwardly open annular groove.

3. A generally cylindrical cotton picker spindle nut having inner, outer and intermediate portions and having an internal bearing-mounting bore and a sleeve telescoped over the outer portion and having one end complementally engaging the intermediate portion along transaxial surfaces, said sleeve terminating short of said outer portion and having a peripheral axially directed annular flange overlapping the remainder of said outer portion and developing an outwardly open annular groove therewith.

4. The invention according to claim 3 and said transaxial surfaces being generally conical.

5. The invention according to claim 3 and said outer portion having an external cylindrical shoulder snugly admitting said sleeve thereon.

References Cited in the file of this patent

UNITED STATES PATENTS

| | | |
|---|---|---|
| 345,312 | Mason | July 13, 1886 |
| 423,540 | Todd | Mar. 18, 1890 |
| 2,856,744 | Barbknecht et al. | Oct. 21, 1958 |
| 2,869,308 | Barbknecht | Jan. 20, 1959 |
| 2,934,878 | Barbknecht et al. | May 3, 1960 |